US008606913B2

(12) United States Patent
Lin

(10) Patent No.: US 8,606,913 B2
(45) Date of Patent: *Dec. 10, 2013

(54) METHOD FOR ADAPTIVELY BUILDING A BASELINE BEHAVIOR MODEL

(71) Applicant: Yeejang James Lin, San Jose, CA (US)

(72) Inventor: Yeejang James Lin, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/683,639

(22) Filed: Nov. 21, 2012

(65) Prior Publication Data

US 2013/0080631 A1    Mar. 28, 2013

Related U.S. Application Data

(63) Continuation of application No. 12/614,774, filed on Nov. 9, 2009, now Pat. No. 8,326,987.

(60) Provisional application No. 61/113,740, filed on Nov. 12, 2008.

(51) Int. Cl.
*G06F 15/173* (2006.01)

(52) U.S. Cl.
USPC ............................... 709/224; 726/22; 726/23

(58) Field of Classification Search
USPC ........................ 709/224; 726/22–23
See application file for complete search history.

(56) References Cited

U.S. PATENT DOCUMENTS

| 5,922,051 | A  | * | 7/1999  | Sidey ............................ 709/223 |
| 6,671,811 | B1 | * | 12/2003 | Diep et al. ....................... 726/23 |
| 8,220,054 | B1 | * | 7/2012  | Lu .................................. 726/24 |
| 8,326,987 | B2 | * | 12/2012 | Lin ............................... 709/225 |
| 2003/0097327 | A1 | * | 5/2003 | Anaya et al. ..................... 705/37 |
| 2005/0188423 | A1 | * | 8/2005 | Motsinger et al. ............... 726/22 |
| 2006/0020814 | A1 | * | 1/2006 | Lieblich et al. ............... 713/182 |
| 2006/0021037 | A1 | * | 1/2006 | Zhuk et al. ...................... 726/22 |
| 2006/0085854 | A1 | * | 4/2006 | Agrawal et al. ................. 726/23 |
| 2008/0148398 | A1 | * | 6/2008 | Mezack et al. .................. 726/22 |
| 2008/0288330 | A1 | * | 11/2008 | Hildebrand et al. ............. 705/10 |
| 2009/0077663 | A1 | * | 3/2009 | Sun et al. ........................ 726/23 |
| 2009/0113554 | A1 | * | 4/2009 | Zalewski ........................ 726/26 |
| 2010/0114634 | A1 | * | 5/2010 | Christiansen et al. ............. 705/7 |

* cited by examiner

*Primary Examiner* — Duyen Doan
(74) *Attorney, Agent, or Firm* — Wang Law Firm, Inc.; Li K. Wang; Stephen Hsu

(57) ABSTRACT

A method for generating an auto-adaptive baseline model for profiling individual and collective behavior of a plurality of network users. The method comprises the steps of creating a model, defining a plurality of members and a plurality of collective variables, each member corresponding to a user, and including a plurality of individual variables, defining conditions for each collective variable and individual variable, upon detecting an activity by a user, updating corresponding individual variables and collective variables, and comparing updated individual variables and collective variables against corresponding conditions. If a condition is met, an alert event is issued to notify designated personnel; otherwise, returning to the step of upon detecting activity. Finally, upon receiving an alert event, the designated personnel decides whether to manually redefine the conditions or to ignore the alert event. If the alert event is ignored, said conditions are automatically redefined in accordance with system defined mechanisms.

13 Claims, 10 Drawing Sheets

METHOD FOR ADAPTIVELY BUILDING A BASELINE BEHAVIOR MODEL

RELATED APPLICATION

This application is a continuation of U.S. application Ser. No. 12/614,774, filed on Nov. 9, 2009 and currently pending, which is a non-provisional of U.S. Provisional Pat. App. No. 61/113,740, filed on Nov. 12, 2008, the specifications of which is included in their entireties by this reference.

FIELD OF THE INVENTION

The present invention generally relates to generation of a baseline behavior model, and more specifically to a method for generating a baseline behavior model for activities of information access in a network data environment.

BACKGROUND OF THE INVENTION

Information security is becoming a crucial issue as more and more information is collected, accessed, and analyzed. The ever-increasing popularity and potential of Cloud Computing takes the information security issue to the center stage of the computing world. Conventional information security measures mainly rely on access control to the information. That is, different levels of authorities are assigned to the users and the information that the users are authorized to access. This type of security measures suffers several disadvantages. First, the access control mechanism only determines what information a user can access and takes no notice of the method, frequency, or timing with which the user accesses the information. Second, the access control mechanism focuses on the activity of an individual member and again takes no notice of aggregate access of a group of members. The aforementioned disadvantages identify the possible security loopholes caused by failure to notice a sudden change in behavior of a member or a group of members, which accounts for a majority of information security breaches in recent years. In other words, conventional access control mechanisms contain flaws which do not effectively prevent leakage of information caused by insiders. Hence, it is imperative to devise a method that profiles the individual and collective behaviors of a plurality of members in a network data environment.

SUMMARY OF THE INVENTION

The present invention has been made to overcome the aforementioned disadvantages of conventional methods. The primary object of the present invention is to provide a method for generating an auto-adaptive baseline model for profiling the individual and collective behavior of a plurality of members in a network data environment, wherein a plurality of conditions are defined in the baseline model, and when a condition is met, the method of the present invent will generate an alert event to notify the occurrence of such condition. For example, a condition may be represented by a threshold of a behavior variable within a profile.

Another object of the present invention is to provide a method for generating an auto-adaptive baseline model for profiling the individual and collective behavior of a plurality of members in a network data environment, wherein upon receiving an alert event, designated personnel can determine whether to act upon the alert event by, for example, redefining the aforementioned conditions; otherwise, the baseline model will automatically adjust to the conditions accordingly. The present invention provides a method for a monitoring device to monitor member activities and to profile behavior, comprising the steps of: monitoring, through a monitoring port, member activities and, upon detecting an activity, updating with the detected activity individual behavior variables and collective behavior variables stored in a storage unit, comparing, by the controller, the updated individual behavior variables and the collective behavior variables against associated threshold conditions, if any threshold condition is met, issuing an alert event, through an user interface, to notify designated personnel, upon receiving an alert event, the designated personnel decides whether to manually redefine the associated conditions or to ignore the alert event; and if the alert event is ignored, the associated conditions are automatically redefined by the processor.

The present invention also provides a method for monitoring data access related information in a network. The method comprises receiving a data access request from a monitoring port, recording information related to the data request in a storage unit, the recorded information being represented by a plurality of counters, each counter having a maximum value, a minimum value, an average value, and a threshold value, comparing, by a controller, the recorded information against the threshold value for a selected counter; issuing an alert to a user interface unit if the recorded information exceeds the threshold value, calculating, by the controller, the maximum value, the minimum value, and the average value for each counter for a predetermined time period updating, by the controller, the maximum value, the minimum value, and the average vale with the calculated maximum value, calculated minimum value, and calculated average value respectively, calculating, by the controller, for the predetermined time period a new threshold value for each counter based on the maximum value, minimum value, average value, and previous threshold value for that counter; and updating, by the controller, the threshold value for each counter with the calculated threshold value.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
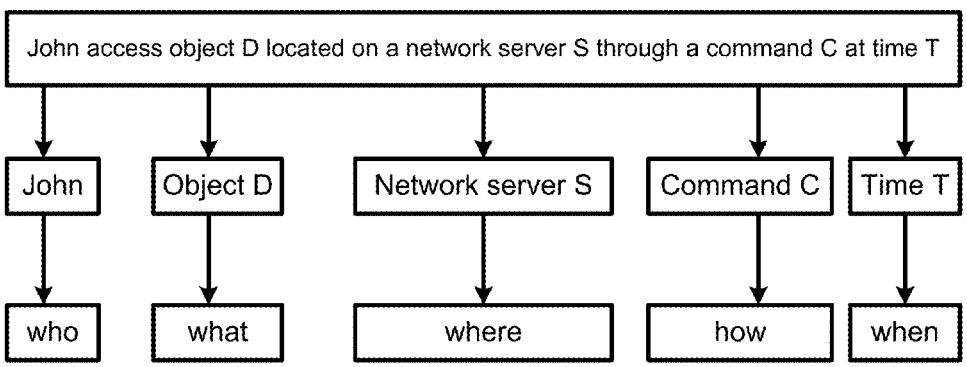
FIG. 1 shows a schematic view of the abstraction of a user's activity into five elements according to the invention.

FIG. 1 shows a schematic view of a model for abstracting a user's activity in a network data environment into five essential elements according to the invention. As shown in FIG. 1, user John accesses a data object D located on a network server S through a command C at time T can be decomposed into five basic elements (5W), namely, John (Who), D(What), S(Where), C(How) and T(When). The baseline behavior model of the present invention is to capture the five elements of all the activities so that when an activity resulting in a condition defined by the baseline behavior model, an alert event will be issued and proper actions taken. These five elements are defined and explained in the sister application for System And Method For Detecting Behavior Anomaly In Information Access, U.S. patent application Ser. No. 12/431,946, filed on Apr. 29, 2009, the specification of which is incorporated in its entirety by this reference.

Figure 2:
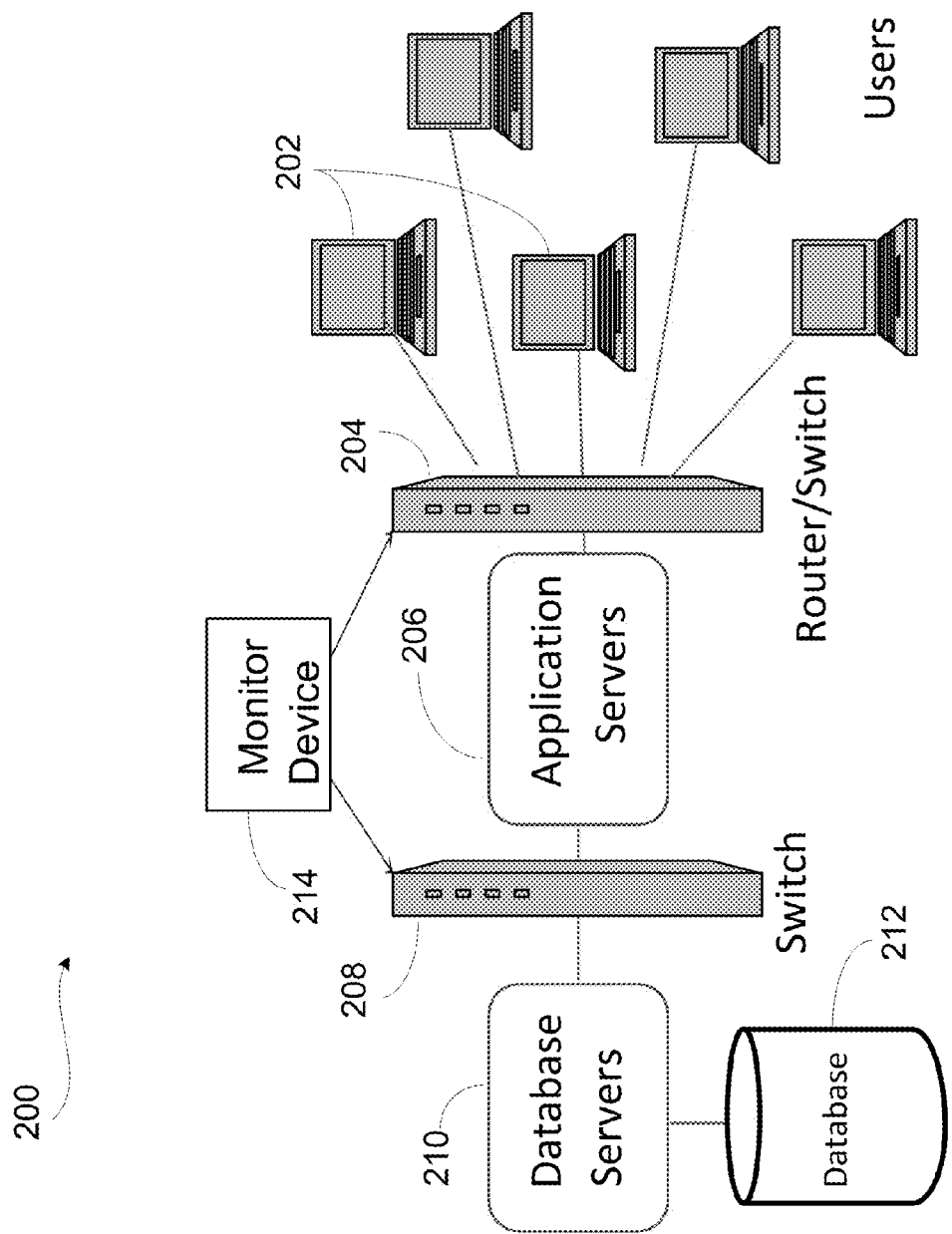
FIG. 2 illustrates a network architecture 200 supporting monitoring of network activities.

FIG. 2 illustrates a network architecture 200 supporting monitoring of network activities based on the model described above. The remote users may use any of computers, workstations, or terminals 202 connected to a data network or a switch/router 204. The users may be workers in a company located in one single location or located in different geographical areas. A user may run an application located on an application server 206 and during execution of the application, requests for certain information located in a database 212 may be requested by the user. The request initiated from a terminal 202 is sent through the router 204 to the application server 206. The application server 206 sends the request to a database server 210. The database server 210 may be connected directly to the application server 206 or may be located remotely from the application server 206 and connected to the application server 106 through a switch 208. After receiving the request, the database server 210 can then retrieve the requested data from a database 212. The requested data then travels back to the terminal 202 from which the request was initiated.

To monitor the access to the database server 210 a monitoring device 214 is introduced. The monitoring device 214 monitors data traffic passing through the router 204 and switch 208. Each request from a remote terminal 202 is recorded as an instance and its content analyzed. Each response from the database server 210 is also recorded as an instance and analyzed. The monitoring device 214 monitors these requests and responses by making copies of every data packets that travel through the monitoring point. The monitoring device 214 reassembles these data packets as the database server 210 would.

Figure 3:
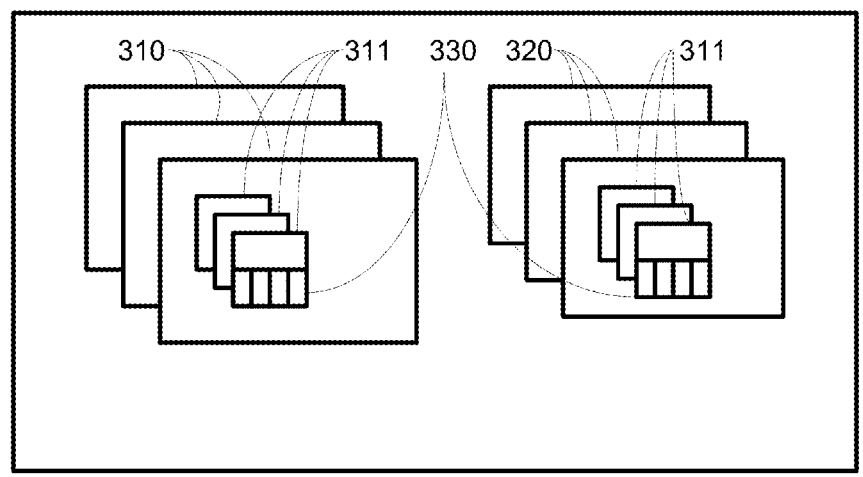
FIG. 3 shows a schematic view of a baseline behavior model according to the present invention.

Based on the abstraction of user activity in FIG. 1, FIG. 3 shows a schematic view of the baseline behavior model for the users of the network shown in FIG. 2 according to the present invention. As shown in FIG. 3, a baseline behavior model 300 includes a plurality of members 310 and a plurality of collective variables 320. A member 310 further comprises a plurality of individual variables 311 with each individual variable 311 associated with a plurality of conditions 330. Each collective variable 320 is a defined as a function of a plurality of individual variables 311. Furthermore, each collective variable 320 is also associated with a plurality of conditions 330. A condition 330 associated with individual variable 311 or collective variable 320 indicates if the value of individual variable 311 or collective variable 320 reaches a certain pre-set value. The individual variables may be seen as behavior variables for an individual profile and collective variables may be seen as behavior variables for group files.

Both individual variable 311 and collective variable 320 can represent any combination of the aforementioned five elements, i.e., Who, How, When, What, and Where. For example, in an exemplary embodiment, an individual variable can store the number of times a user accesses a certain data, and one condition associated with this individual variable can be when the number of times for the user to access this data exceeds, say, 100 times. Similarly, a collective variable can store the number of times that the staff members of a department use an SQL command, e.g., SELECT, which can be obtained by monitoring the staff members of the department.

Figure 4:
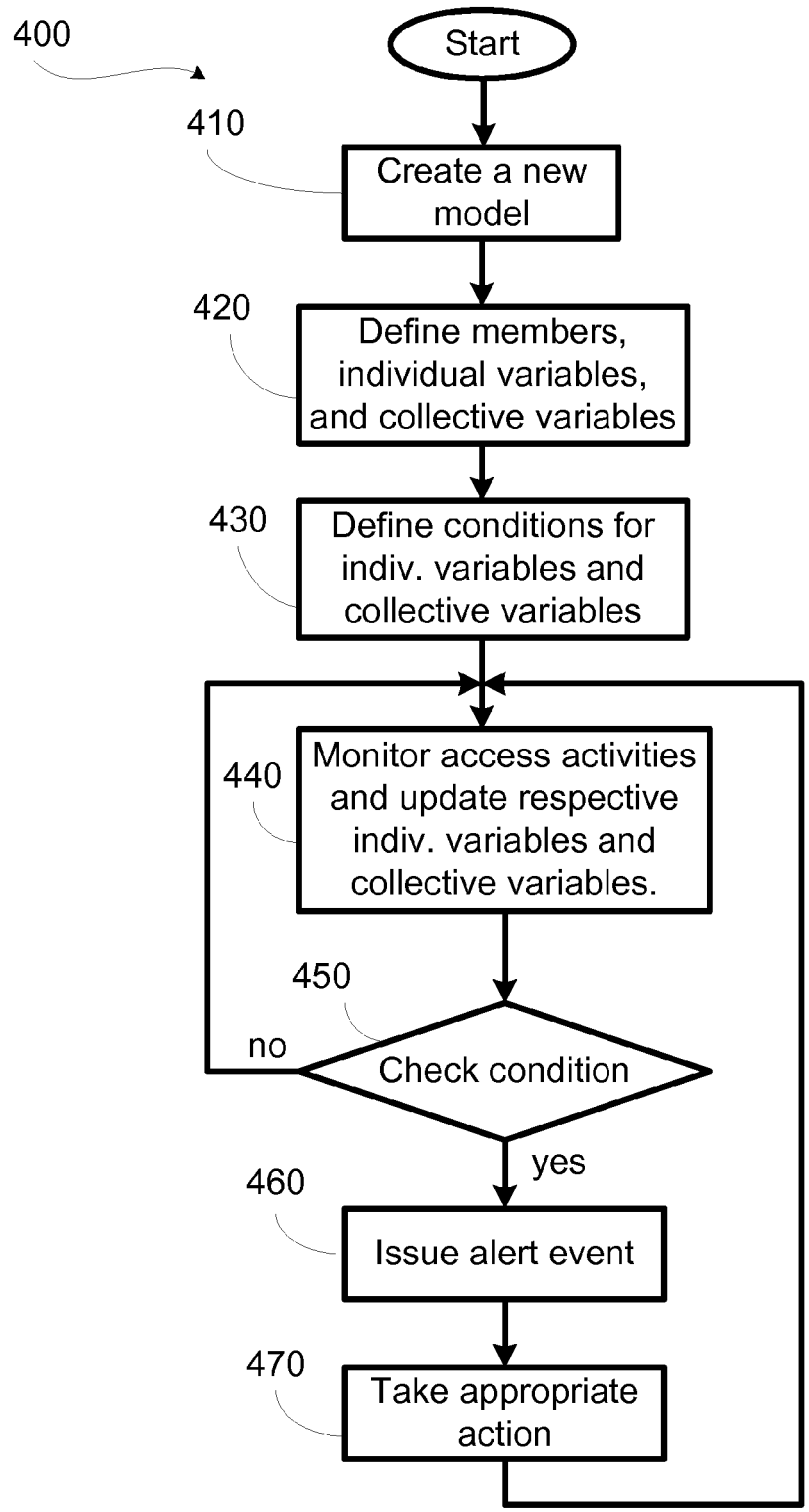
FIG. 4 shows a flowchart of the method for generating auto-adaptive baseline behavior model according to the present invention.

FIG. 4 shows a flowchart 400 of the method for generating auto-adaptive baseline behavior model according to the present invention. As shown in FIG. 4, step 410 is to create a new model. Step 420 is to define a plurality of members and a plurality of collective variables, each said member has a plurality of behavior variables. Step 430 is to define a plurality of conditions for each individual variable and collective variable. Step 440 is to monitor access activities and update corresponding individual variables and collective variables. Step 450 is to check whether any defined conditions are met; if so, step 460 is to issue an alert event; otherwise the process returns to the step of monitoring and detecting user's activity. Finally, step 470 is to, upon receiving an alert event, take corresponding action, and then return to step 440 to continue the step of monitoring and detecting access activity.

It is worth noting that in step 420, the defined members along with the individual variables and the collective variables constitute the new model created in step 410. In addition, collective variable can be defined as a function of a plurality of individual variables. For example, in an exemplary embodiment, collective variable $X_1$ can be a weighted average of a plurality of individual variables $I_1, I_2, \ldots, I_n$, while another collective variable $X_2$ can be a maximum function of the same plurality of individual variables $I_1, I_2, \ldots, I_n$, and so on. In this manner, more sophisticated statistical techniques, higher order polynomials or other mathematic models can be used to describe and analyze the behavior of an individual member or collective behavior of a group of members. It is also worth noting that the baseline behavior model is an open system. In other words, the members, individual variables, and collective variables can be added to or removed from the model at any point.

The conditions defined in step 430 associate with each individual variable 311 and each collective variable 320, respectively, and are tested against them in step 440. In step 440, each activity is profiled through the abstraction depicted in FIG. 1. That is, the Who, What, Where, How and When elements of the activity are captured and corresponding individual variables 311 of corresponding member 310 are updated accordingly. In addition, corresponding collective variables 320 are also updated accordingly. It is worth noting that in step 440, the update of respective individual variables 311 and collective variables 320 is done in an incremental manner. In other words, each time activity is detected and captured, respective individual variables 311 and related collected variables 320 are also updated. In this manner, realtime updating can prevent potential information security threats from going unnoticed and propagating to a later stage.

Then, in step 450, updated individual variables 311 and collective variables are tested against respective defined conditions to check whether any associated condition is met. For any condition that is met by the respective variable, an alert event is sent to designated personnel, such as a manager or system administrator, to signal the occurrence of such activity, as shown in step 460. In step 470, the personnel receiving the alert event can take respective action, such as, investigating whether a behavior of information security concern has been committed by whom (Who), with what object (What), on which network data server (Where), at what time (When), or through which command (How). In addition, the personnel can also redefine conditions associated with respective variables involved in the warning event, if necessary. Alternatively, if no action is taken by the personnel, for example, by responding to the warning event after a defined duration, the method would then proceed to adjust or redefine conditions associated with respective variables to reflect the changed baseline model.

For example, in an exemplary embodiment of the present invention, user John's access to data object D at midnight (Time) may seem out of ordinary (if a corresponding condition associated with Time-related variable is defined), hence, such an activity will trigger issuance of an alert event. However, if this event is deemed by the personnel to be acceptable, e.g., John is current working in a different time zone, the personnel can either respond to the warning (alert) event by adjusting or redefining the respective conditions, or, alternatively, ignore the warning event, and the model will automatically adjust or redefine the conditions in accordance with a system defined manner, such as, shifting the alert time range, expanding the later alert time range by a certain percentage, eliminating the alert time, and so on.

Furthermore, a step of logging the issuance of warning event can be added after step 460 for auditing purposes as well as an additional mechanism to enhance information security.

Figure 5:
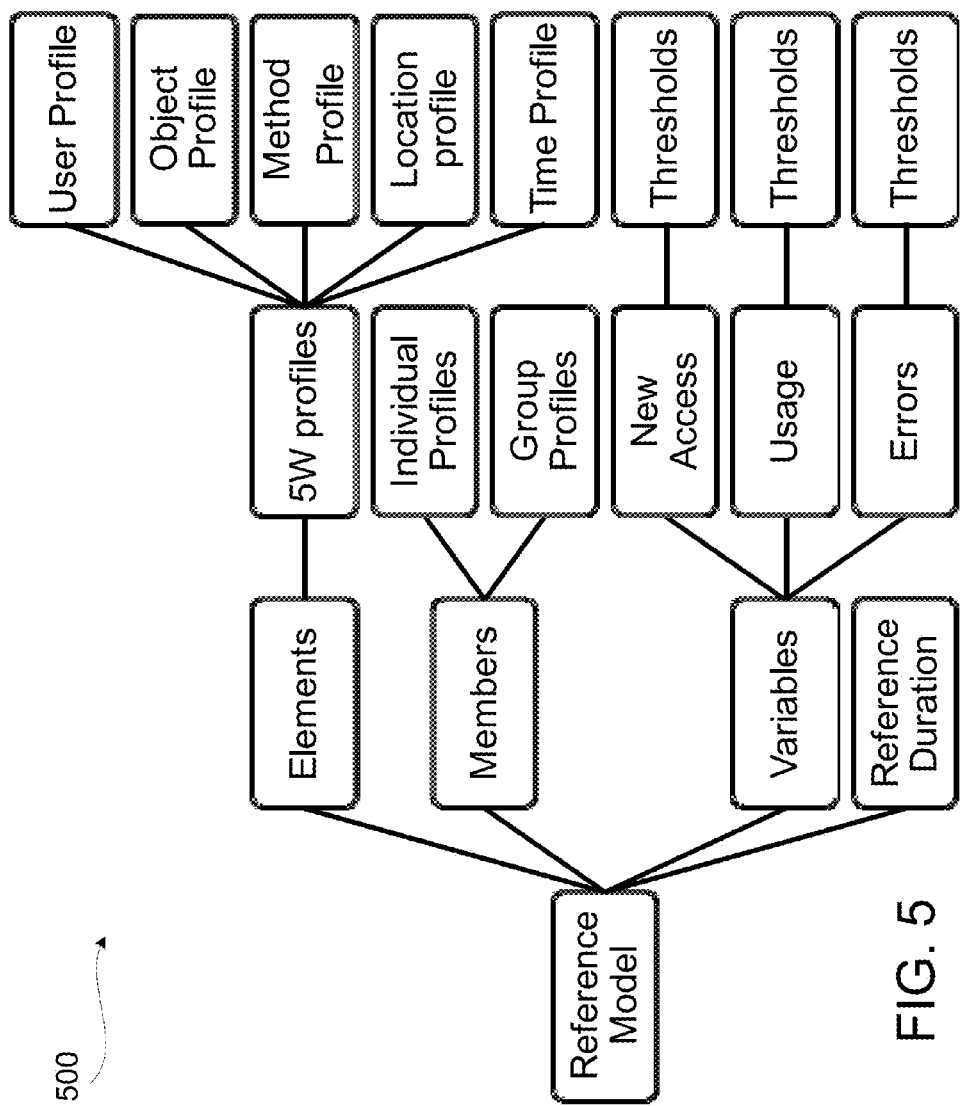
FIG. 5 illustrates a reference model according to the invention.

The method described above for creating a baseline behavior model is based on a reference model defined by four dimensions: elements, members, variables, and reference duration. The reference model 500 is illustrated by FIG. 5. The reference model 500 is defined by four dimensions: elements, members, variable, and reference duration. The elements are the five elements described above and the behavior of each element member is governed by a profile. An element member is a member of the element. For example, if the element is "User," its member is an individual user; if the element is "Database Table," its member may be a specific table. The member may be by itself (individual) or part of a group. The member is defined by an individual profile and also defined by a group profile if he is part of a group. The variables are the counters that describe a member's behaviors. For example, for a user John, counters may be used to track his access to a specific table in a database, errors related to his access, etc. For each counter, there are related parameters such as threshold, maximum, minimum, and average values. The reference duration is a user set time period for adjusting parameters in the reference model. For example, the threshold values for each counter may be recalculated and adjusted each day or each week.

Figure 6:
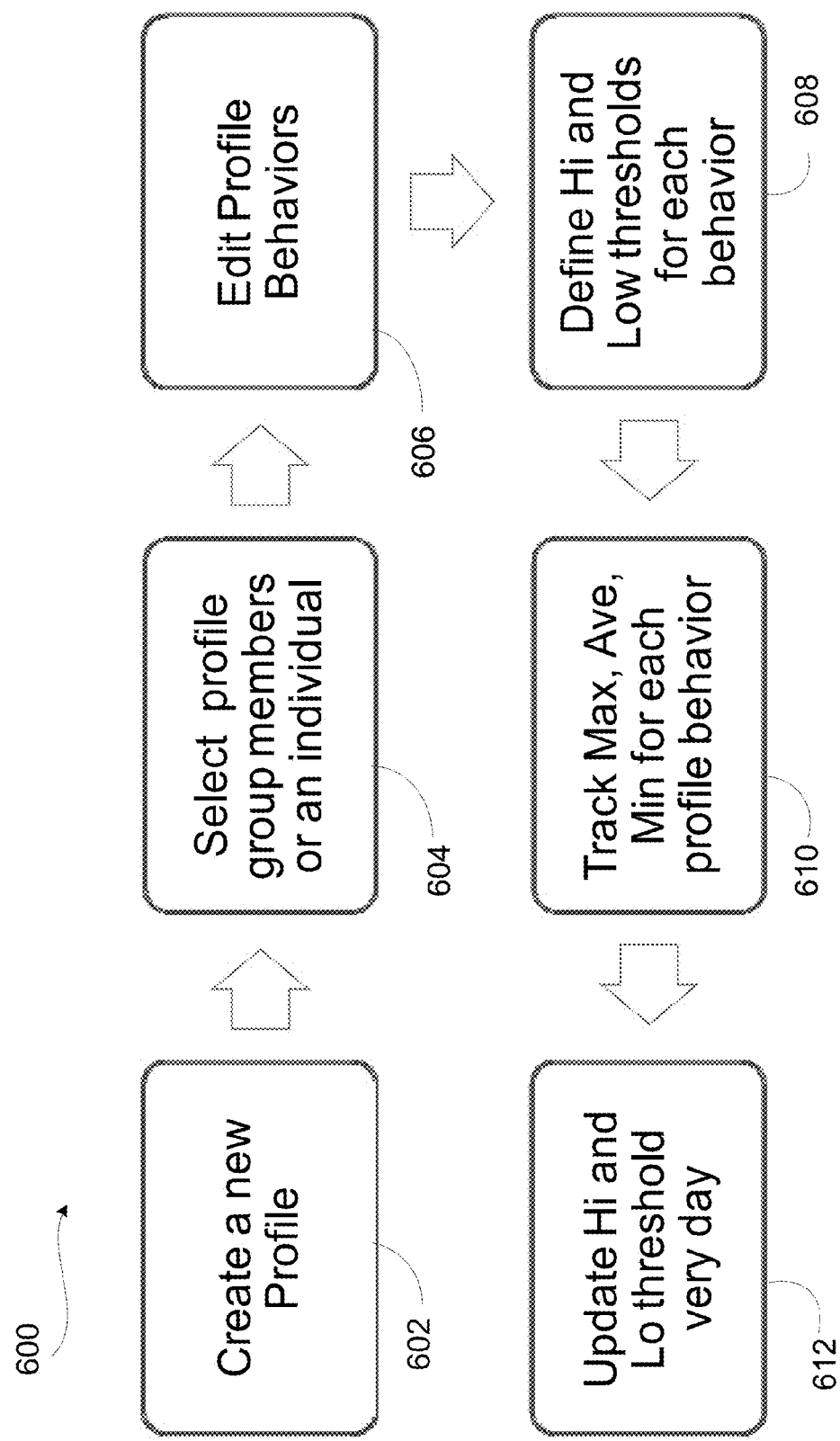
FIG. 6 illustrates a process for creating a profile.

In this reference model, a profile may be defined for an individual profile for an individual profile or for a group profile for a group. A profile is a description of a set of behaviors (also known as variables). Each profile behavior represented by a corresponding counter is governed by a set of high and low thresholds. The profile counters may include new access counter, usage counter, and error counter. For each profile counter there is a list of parameters: Max (the largest value of a given counter among group members), Min (the smallest value of a given counter among group members), Ave (average value among all group members), and current threshold values. The threshold values of profile counters may be updated automatically according to a corresponding list of aforementioned parameters. FIG. 6 illustrates a process 600 for creating a profile for a group or an individual. A profile for a group or an individual is created, step 602, and if the profile is for a group, then members for the group are defined, step 604. If the profile is an individual, then the individual is defined. Editing the profile behavior, step 606, includes defining high and low thresholds for each behavior counter in the profile, step 608. After the profile is defined, the monitoring system will track Max, Average, Min, and current thresholds for each profile behavior. This tracking includes comparing a current behavior data relating to a data request with behavior data from profile behavior counters, step 610. For each access activity of any group member parameters (Max, Min, Ave) of corresponding behavior counters of its group profile are updated. The high and low threshold values for these behavior counters may be updated every day or after a defined period. The issuance of the alert event means that a particular member's behavior has deviated from the group profile that member belongs to.

Figure 7:
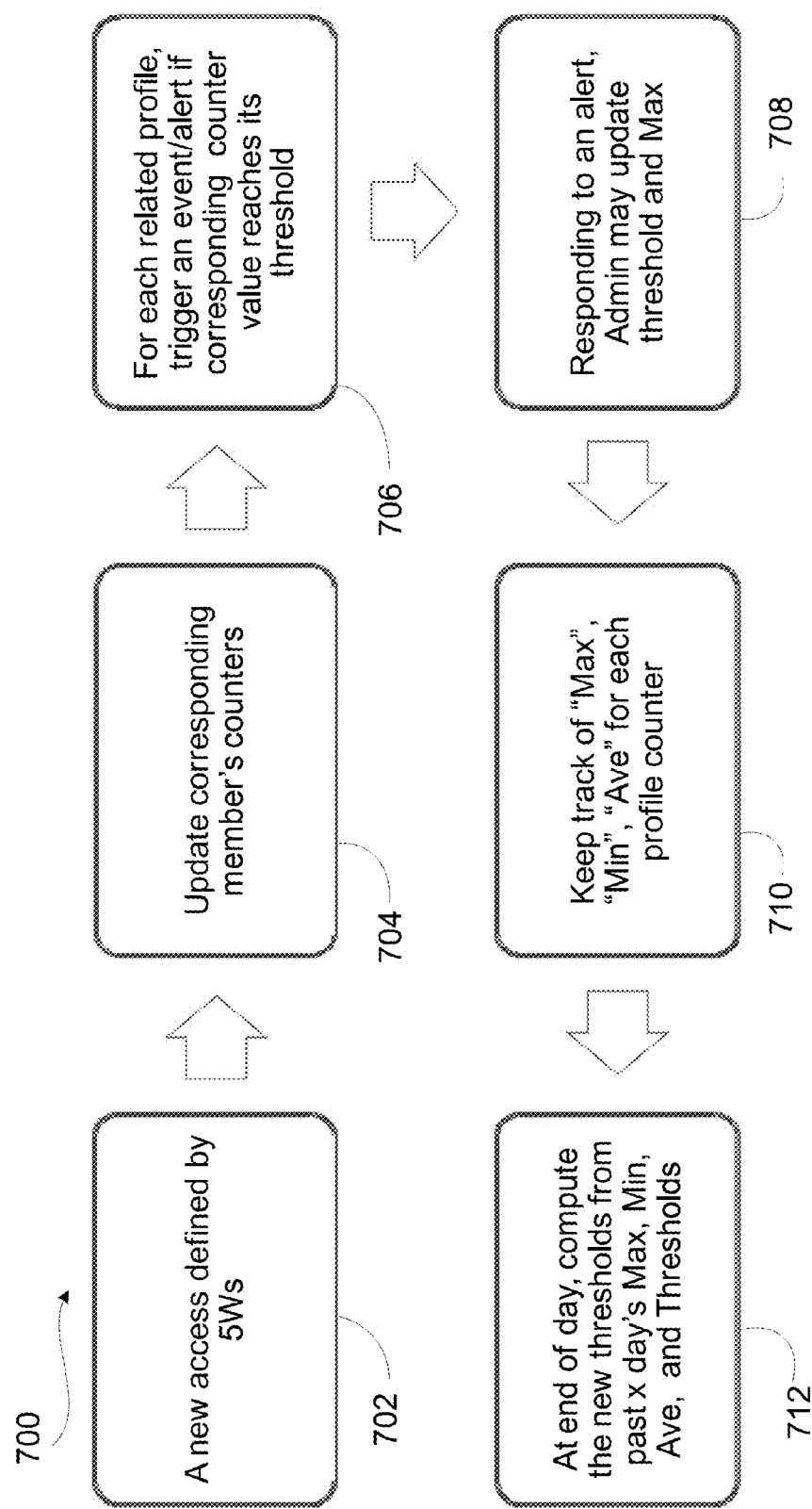
FIG. 7 illustrates a process for updating a group profile.
Figure 11:
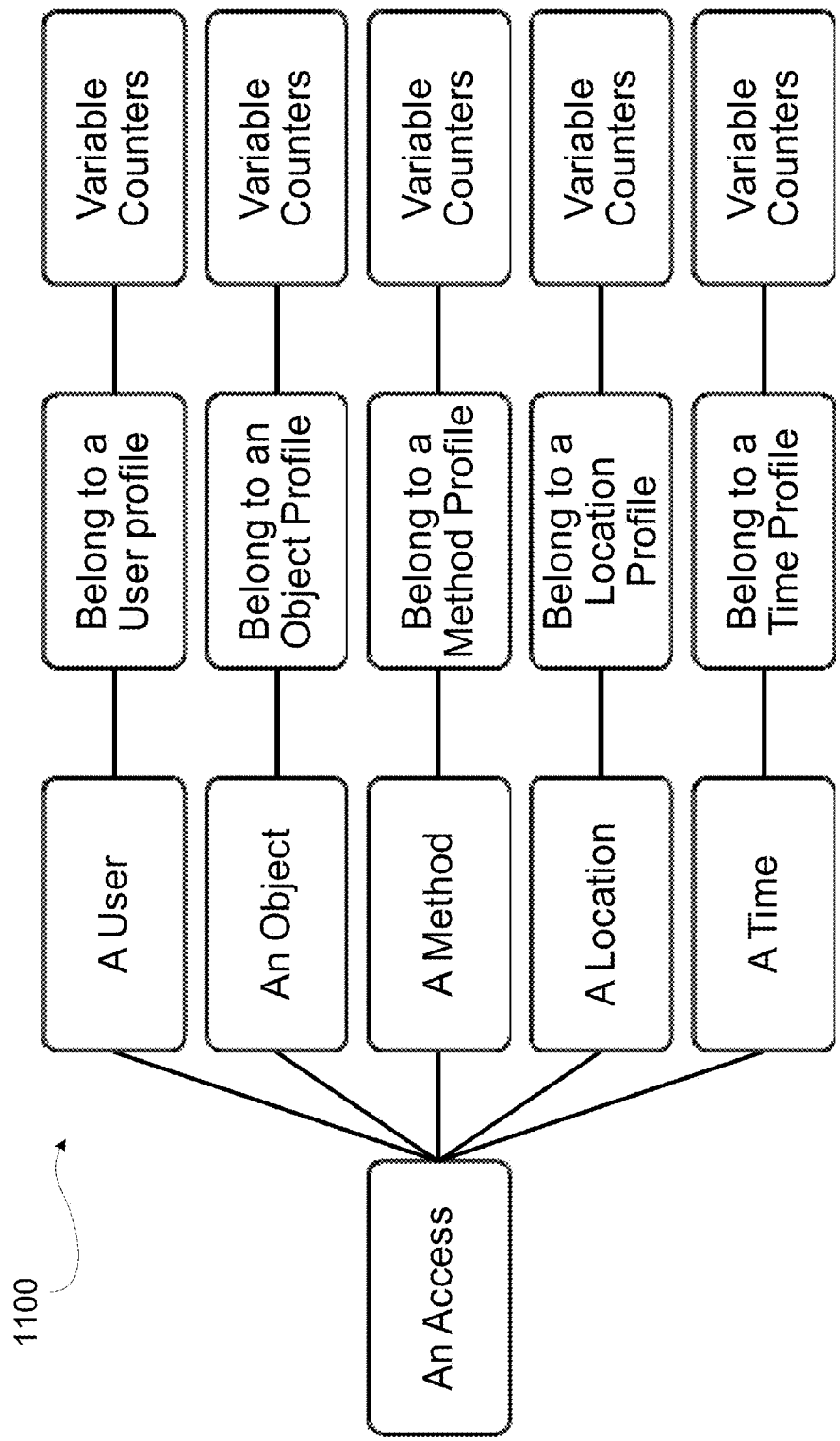
FIG. 11 is an illustration for an access.

Similar to the group profile, an individual profile is defined for each member. The individual profile is also defined by a set of individual behavior counters and the individual behavior counters include new access counter, usage counter, and error counter. Other counters may be included if other aspect of behavior is considered. FIG. 11 is an illustration 1100 for an access. The information related to an access can be broken down into five elements and for each element member there is a profile and the profile is defined by a plurality of variable counters (behavior counters). Each element member in the access can be tracked by the process 700 illustrated by FIG. 7. When a new access (new data request) from a member (e.g. a user) is recorded, step 702, the data related to the access is recorded in term of five elements (5)—who, when, where, how, and what, i.e., the data related to the access is recorded into five different profiles. For each profile, the following actions are taken. This data for this access is recorded in the behavior counters, step 704. The behavior counters of the member profile for that access are evaluated against the behavior counters of the member's profile and an alert event is triggered if the behavior counter value reaches its threshold, step 706. The information for this alert event is presented to the designated personnel, who can then decide whether to update threshold or other parameter values for the member, step 708. The designated personnel may also choose to ignore the alert. The system will continue to track of "Max," "Min," and "Ave" values for each behavior counter, step 710, and the system will also compute new thresholds based on the "Max," "Min," and "Ave" values at a predefined time and for a predefined period. A designated person may define such a time and a period to update threshold values, for instance, 11 PM every day or 2 AM every Sunday. The calculation may be based on the data from a past period and this period may be set to one day, two days, one week, one month, and etc., step 712. The above description above is equally applicable for information related to the access for any of five elements, i.e., the process 700 can be applicable for updating a user profile, an object profile, a method profile, a location profile, or a time profile listed in FIG. 11.

The "Max," "Min," and "Ave" values for each behavior counter are computed over a reference duration. The reference duration is defined by the designated personnel. The threshold values are calculated as follows:

New high threshold=$f$(Max,Ave,current high threshold);

New low threshold=$f$(Min,Ave,current low threshold);

The behavior counter values are computed as follows:

$Mi$=Maximum($Ci1,Ci2,Ci3,\ldots,Cim$);

$$Ni = \text{Minimum}(Ci1, Ci2, Ci3, \ldots, Cim);$$

$$Ai = \text{Average}(Ci1, Ci2, Ci3, \ldots, Cim);$$

Cij being counter value for behavior i for member j, m being number of members in a group.

Assuming the reference duration being k, the collective Max, Min, and Ave values and high and low threshold values for the reference duration k are calculated as follows:

$$\text{Max} = f(M1, M2, \ldots, Mk);$$

$$\text{Min} = f(N1, N2, \ldots, Nk);$$

$$\text{Ave} = f(A1, A2, \ldots, Ak);$$

$$Hk+1 = f(\text{Max}, \text{Ave}, Hk);$$

$$Lk+1 = f(\text{Min}, \text{Ave}, Lk);$$

Figure 8:
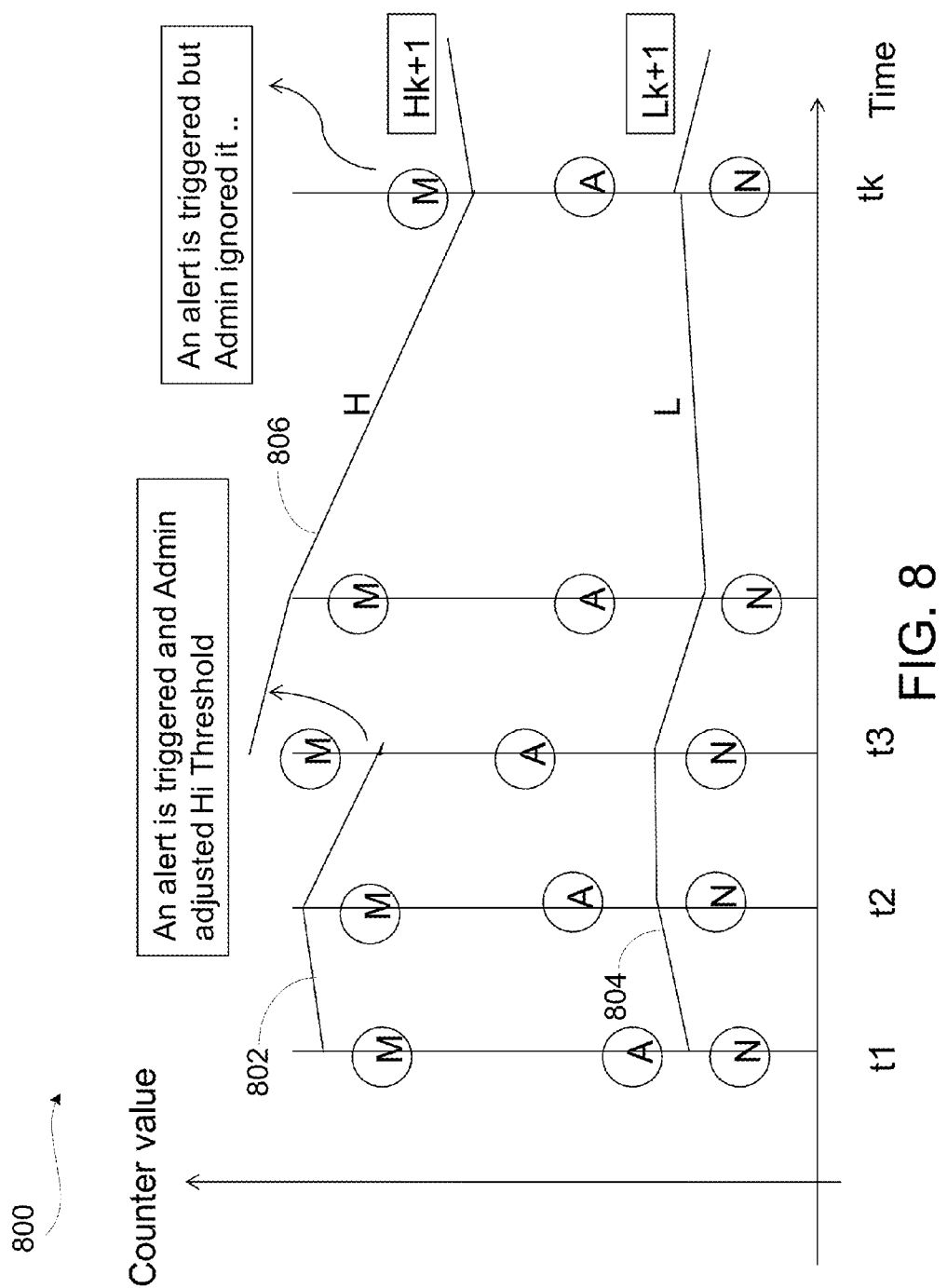
FIG. 8 is an illustration of auto update of threshold values of a profile

FIG. 8 is an illustration 800 of auto update of threshold values of a profile. The behavior counter values M, N, and A for time t1, t2, ... tk are illustrated. The high threshold H 802 and low threshold L 804 are also plotted on FIG. 8. At each time period, M, N, and A are re-calculated. At t3, M value exceeds the high threshold value H, and an alert is triggered. The designated personnel adjust the high threshold and a new high threshold H 806 is calculated. When the designated personnel choose not to adjust the high threshold as shown in time tk, M value would remain above the high threshold H 806.

When an alert is issued because a behavior counter value falls outside of the high threshold or low threshold, the alert indicates an abnormal behavior related to an access by a user. The designated personnel will evaluate whether this new behavior is an acceptable behavior and part of a new normal behavior. If so, then a new threshold value, whether high or low, is calculated for the profile of this user. If the alert is a first alert for the user, the designated personnel may choose not to update the threshold values and wait for additional occurrences. The designated personnel may choose to re-calculate the threshold values after a predefined number of alerts are received.

Figure 9:
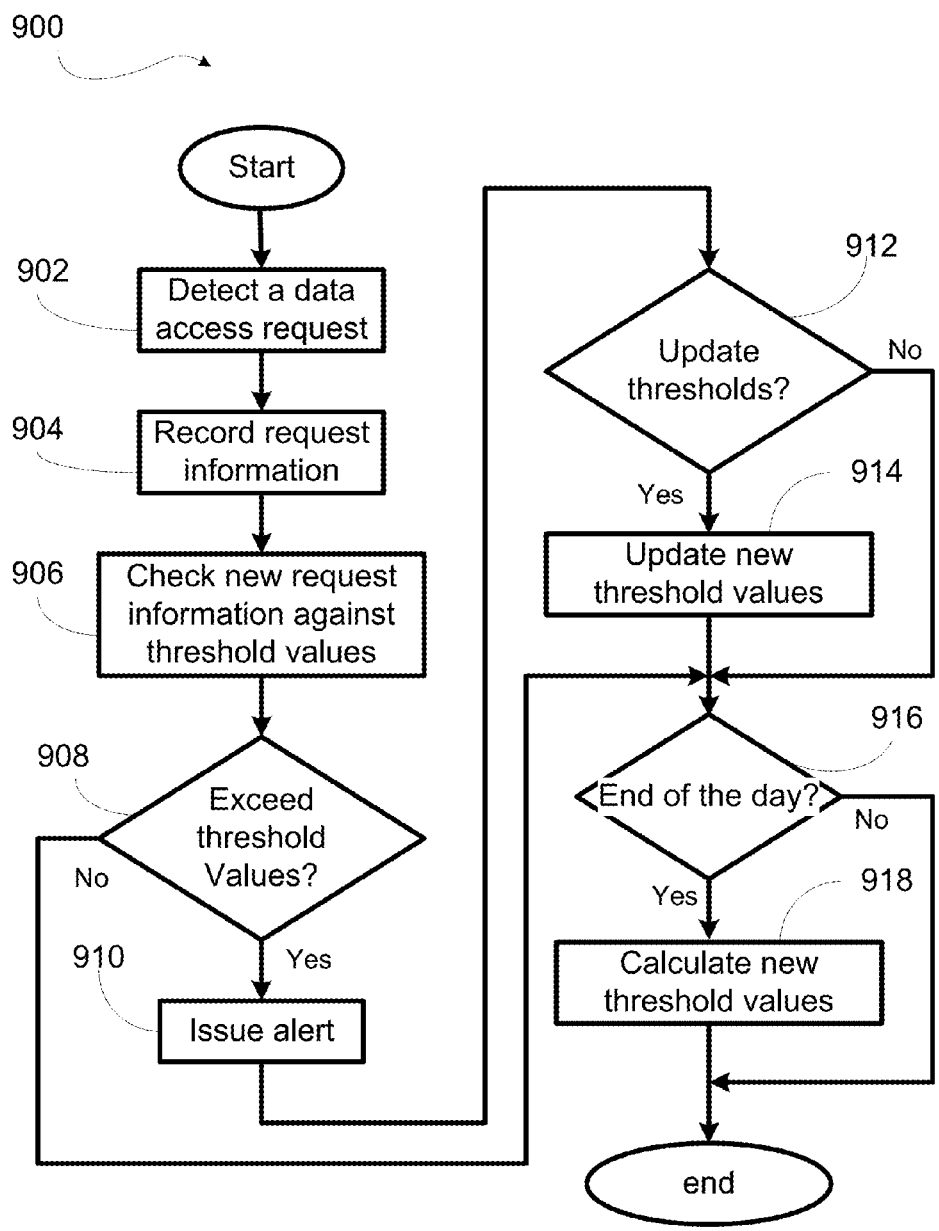
FIG. 9 is a process for automatically adjusting baseline values for behavior counters of a profile

FIG. 9 is a process 900 for automatically adjusting baseline values for behavior counters of a profile. When an access is detected, step 902, the information relating to the access is recorded in terms of five basic elements and into different profiles, step 904. For example, there are the user profile, object profile, method profile, location profile, and time profile. After identifying the access to a user, the information is recorded by a counter corresponding to that behavior in the profile of that user. The recordation by that corresponding counter of that user will affect the profile of the group to which the user belongs. After the access data is recorded, the system will determine whether any threshold value of any counter has been exceeded, step 906. If a threshold value has been exceeded, step 908, an alert event will be issued, step 910, and the designated personnel will then be notified. If the designated personnel choose to update the threshold value in view of new access data, step 912, update new threshold values step 914. When calculating new threshold values, historic data of the user may be considered. At a predetermined time, for example, at the end of each day, step 916, new threshold values 918 may be calculated. The steps 906, 908, 910, 912, and 914 are applicable not only for user profile, but also for method profile, time profile, location profile, and object profile. When a system detects a data access request, the system records the data request information and then performs steps 906-914 for all five basic elements listed in FIG. 11.

Figure 10:
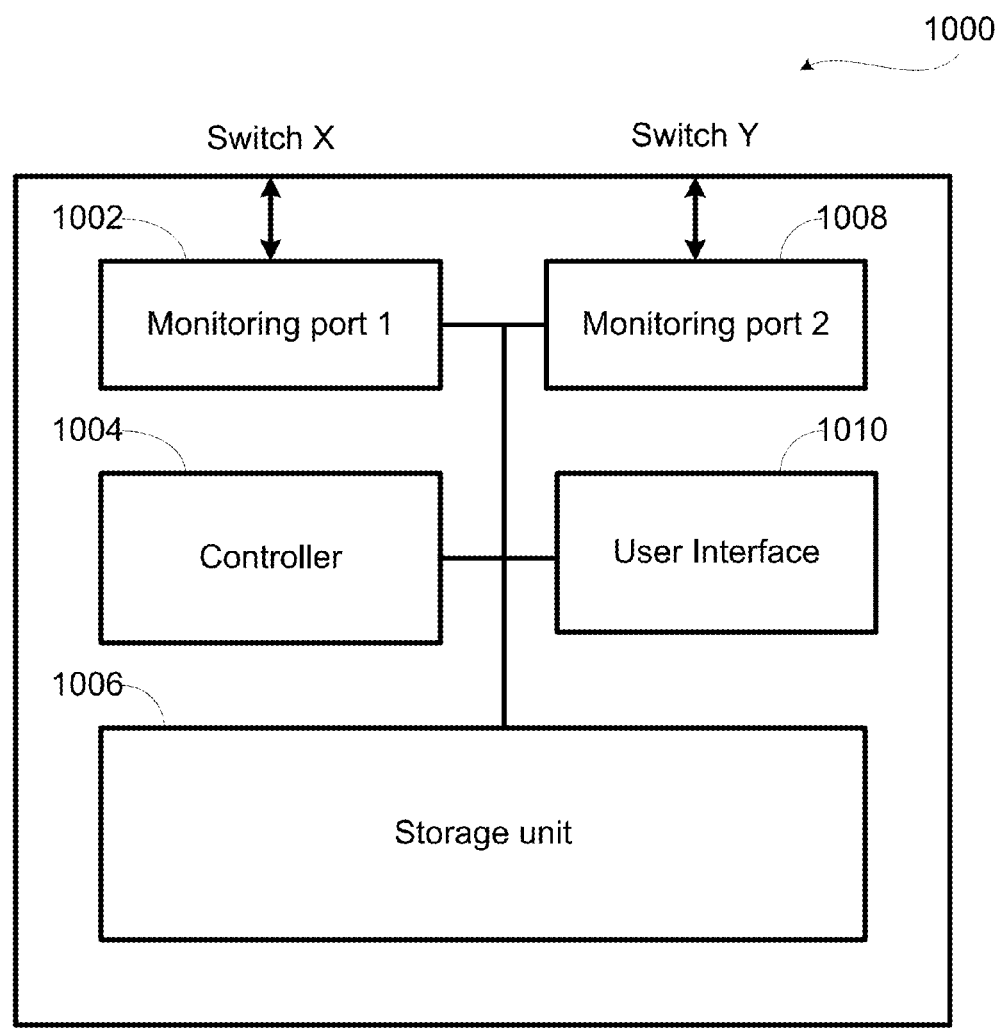
FIG. 10 is an architecture for a monitoring device.

FIG. 10 is architecture 1000 for a monitoring device 214. The monitoring device 214 may have one or more monitoring port, 1002, 1008, for connecting to two or more monitoring points. The monitoring device 214 includes a controller 1004, a user interface unit 1010, and a storage unit 1006. The controller 1004 checks the access request data captured by the monitoring ports 1002 and 1008, updates corresponding behavior counters, and stores these counters in the storage unit 1006. The controller 1006 checks the behavior counter values against the corresponding thresholds and issues alerts if necessary. The user interface unit 1010 displays the alerts to the designated personnel and receives commands from the designated personnel. Though separate units are shown, they can easily be replaced by one or multiple hardware units capable of performing similar functions.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims. It is understood that features shown in different figures can be easily combined within the scope of the invention.

What is claimed is:

1. A method, for a monitoring device to monitor member activities originated by a member, comprising the steps of:
   monitoring, through a monitoring port, member activities;
   upon detecting an activity, updating with the detected activity individual variables and collective variables stored in a storage unit, each member being associated with a plurality of individual variables and each collective variable being defined as a function of a plurality of individual variables;
   comparing, by the controller, the updated individual variables and the collective variables against respective associated threshold conditions;
   if any of the updated individual variables and the collective variables exceeds a respective associated threshold condition, issuing an alert event, through an user interface, to notify designated personnel;
   upon receiving an alert event, deciding by the designated personnel whether to manually redefine the associated threshold condition or to ignore the alert event; and
   if the alert event is ignored, redefining automatically by the controller the associated threshold condition.

2. The method as claimed in claim 1, wherein each individual member variable represents a combination of Who element, When element, Where element, How element, and Where element.

3. The method as claimed in claim 1, wherein each collective variable is a sum of an individual variable performed by all members.

4. The method as claimed in claim 1, wherein the step of redefining the associated threshold conditions automatically by the controller further comprises the controller periodically updates the threshold conditions based on data collected from a past period.

5. The method as claimed in claim 1, wherein the step of issuing an alert event further comprises logging the issuing of the alert event.

6. The method as claimed in claim 1, wherein the step of automatically redefining the conditions is executed by the processor if the designated personnel does not respond to the alert event after a defined duration.

7. A method for monitoring data access related information in a network, the method comprising the steps of:
receiving a data access request from a monitoring port;
recording information related to the data access request in a storage unit, the recorded information being represented by a plurality of counters, each counter having a maximum value, a minimum value, an average value, and a threshold value;
comparing, by a controller, the recorded information against the threshold value for a selected counter;
issuing an alert to a user interface unit if the recorded information exceeds the threshold value;
calculating, by the controller, if no new threshold value is received from the user interface in response to issuance of the alert, a calculated maximum value, a calculated minimum value, and a calculated average value for each counter for a predetermined time period;
updating, by the controller, the maximum value, the minimum value, and the average vale with the calculated maximum value, the calculated minimum value, and the calculated average value respectively to obtain an updated maximum value, an updated minimum value, and an updated average value;
calculating, by the controller, for the predetermined time period an updated threshold value for each counter based on the updated maximum value, the updated minimum value, the updated average value, and the threshold value for that counter; and
updating, by the controller, the threshold value for each counter with the updated threshold value.

8. The method of claim 7, further comprising the steps of:
receiving a new threshold value from the user interface; and
updating the threshold value for the selected counter with the received threshold value.

9. The method of claim 7, wherein the information related to the data access request can be broken down into a combination of Who element, When element, Where element, How element, and Where element.

10. The method of claim 7, wherein the threshold value is defined by a user.

11. A non-transitory computer-readable medium, for a monitoring device to monitor member activities originated by a member, comprising instructions that, when executed by a processor, cause the processor to perform acts comprising:
monitoring, through a monitoring port, member activities;
upon detecting an activity, updating with the detected activity individual variables and collective variables stored in a storage unit, each member being associated with a plurality of individual variables and each collective variable being defined as a function of a plurality of individual variables, each individual member variable represents a combination of Who element, When element, Where element, How element, and Where element;
comparing, by the controller, the updated individual variables and the collective variables against respective associated threshold conditions;
if any of the updated individual variables and the collective variables exceeds a respective associated threshold condition, issuing an alert event, through an user interface, to notify designated personnel;
upon receiving an alert event, deciding by the designated personnel whether to manually redefine the associated threshold condition or to ignore the alert event; and
if the alert event is ignored, redefining automatically by the controller the associated threshold condition.

12. The non-transitory computer-readable medium of claim 1, wherein each collective variable is a sum of an individual variable performed by all members.

13. The non-transitory computer-readable medium of claim 1, wherein the step of redefining the associated threshold conditions automatically by the controller further comprises the controller periodically updates the threshold conditions based on data collected from a past period.

* * * * *